Oct. 25, 1949.   J. MARINELLI   2,486,047
SUPERCHARGER REGULATOR
Filed Oct. 7, 1947
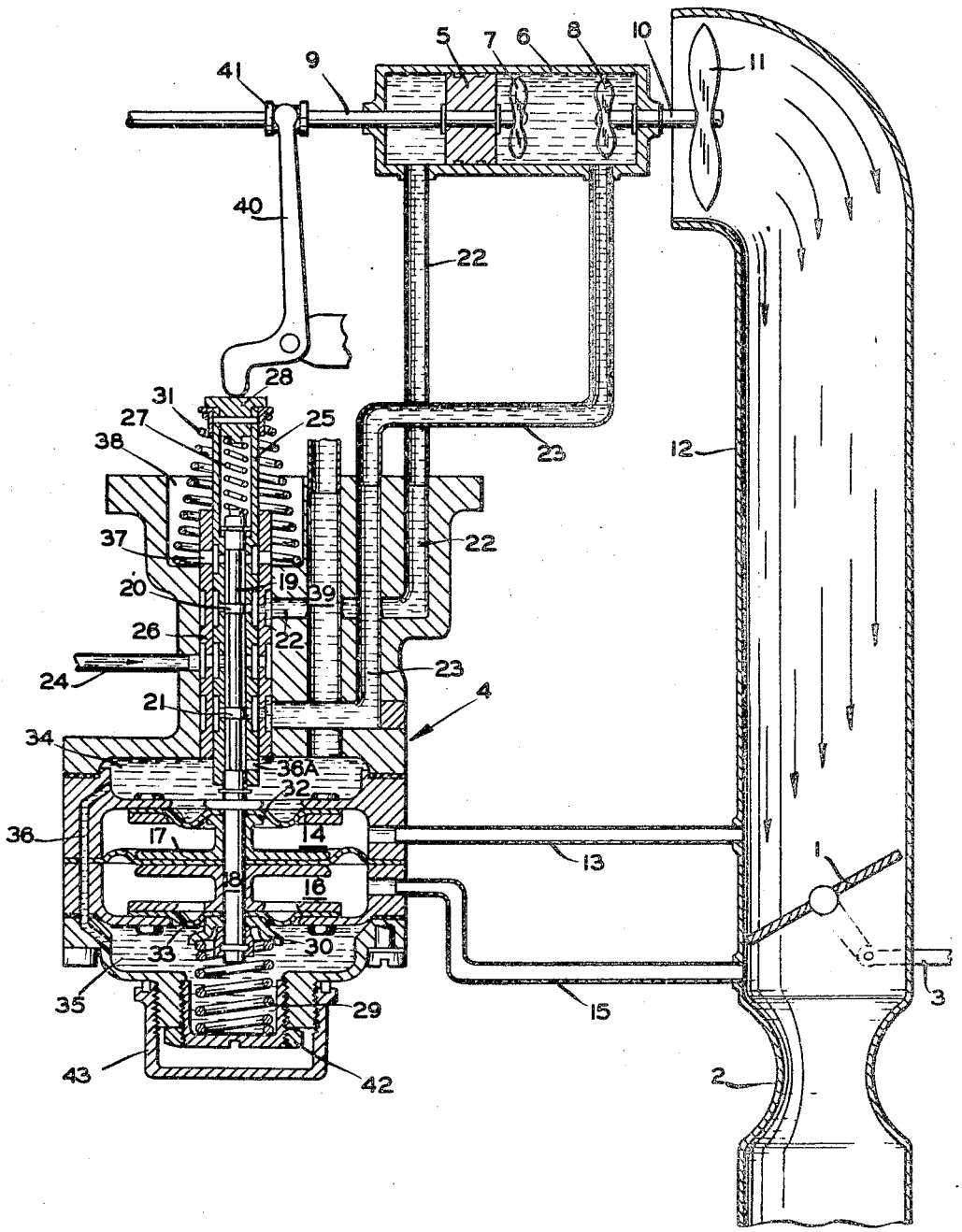
INVENTOR.
JOSEPH MARINELLI
BY
-ATTORNEY- Patented Oct. 25, 1949

2,486,047

UNITED STATES PATENT OFFICE 2,486,047

SUPERCHARGER REGULATOR

Joseph Marinelli, Newark, N. J., assignor to Bendix Aviation Corporation, Teterboro, N. J., a corporation of Delaware Application October 7, 1947, Serial No. 778,347

6 Claims. (Cl. 230—5)

The present invention relates to a supercharger regulator and more particularly to a system designed to maintain a predetermined constant pressure differential across the throttle valve of a carburetor for an aircraft engine.

An object of the invention is to provide a novel compact regulator including a main control valve, an auxiliary sleeve valve for effecting a follow-up action, a fluid pressure operated diaphragm for controlling the main valve, and liquid damping means arranged at opposite sides of the diaphragm and connected by a damping bleed to retard the regulator from hunting.

Another object of the invention is to provide a novel compact regulator including a main control valve, an auxiliary sleeve valve for effecting a follow-up action, a spring for interconnecting the sleeve and main valves, and a pair of spring elements at opposite ends of the sleeve and main valves for mounting the same in floating relation.

Another object of the invention is to provide a novel device for regulating the driven speed of a supercharger so as to maintain a predetermined constant differential pressure across the throttle valve of a carburetor.

The above and other objects and features of the invention will appear more fully hereinafter from a consideration of the following description taken in connection with the accompanying drawing wherein one embodiment of the invention is illustrated by way of example.

The drawing is a sectional view of the regulator shown schematically in operative relation in the control system of a supercharger.

In the drawing numeral 1 indicates a throttle valve for a venturi 2 of a carburetor. The throttle valve 1 may be controlled by an aircraft pilot through a linkage 3.

A regulator 4 responsive to the differential pressure across the throttle valve 1 controls the servo pressure to piston 5 movably mounted in a cylinder 6 and arranged to adjust a hydraulic coupling of conventional type and including blades 7 and 8.

Blades 7 of the hydraulic coupling may be driven through a shaft 9 by the aircraft engine, while blades 8 are connected by a shaft 10 to a supercharger 11. It will be seen that the cylinder 6 is filled with a hydraulic fluid which hydraulically couples the blades 7 to the blades 8. The driven speed of the supercharger 11 decreases as the blades 7 are moved to the left as viewed in the drawing, and increases as the blades 7 are moved to the right by the adjustment of the piston 5.

A conduit 12 connects the outlet of the supercharger 11 to the venturi 2 of the carburetor. The throttle 1 is adjustably positioned in the conduit 12 to control the flow of air to the carburetor.

Pressure conduit 13 leads from the upstream side of the throttle 1 to a chamber 14 in the regulator 4; while a pressure conduit 15 leads from the downstream side of the throttle valve 1 to a chamber 16 formed in the regulator 4. Separating the chambers 14 and 16 is a differential diaphragm 17 operably connected to an end 18 of a main servo control valve 19 which has provided lands 20 and 21 for controlling the flow of a fluid medium through conduits 22 and 23 and to and from the cylinder 6. A fluid inlet conduit 24 connected to a suitable source of fluid pressure, not shown, is controlled by valve 19 which thereby controls the position of the coupling piston 5.

The valve 19 is slidably mounted in a sleeve valve 25 which is also slidably mounted in a fixed valve sleeve 26 mounted in the casing of the regulator 4.

A spring 27 interconnects the main servo valve 19 to the sleeve valve 25 at the head portion 28 while a spring 29 bears at the end 30 on the main servo valve 19. A spring 31 bears at the opposite end of the sleeve valve 25.

Also attached to the main servo valve stem at the end 18 are auxiliary diaphragms or membranes 32 and 33 which form within the regulator 4 liquid filled chambers 34 and 35 respectively. The chambers 34 and 35 are interconnected by a damping bleed passage 36. As shown in the drawing, the diaphragm or membrane 17 has a greater effective surface area than the auxiliary diaphragm or membranes 32 and 33.

Also opening into the chamber 34 at 36A is an exhaust passage leading from the interior of the sleeve valve 25. Another exhaust passage 37 opens from the interior of the sleeve valve 25 to a recess 38 formed in the regulator 4 and opening to a suitable drain sump, not shown. The spring 31 is positioned in the recess 38. Leading from the chamber 34 is a passage 39 which also leads to a suitable drain sump, not shown.

Bearing upon the head portion 28 of the sleeve valve 25 is one end of a pivoted bell crank lever 40. The opposite end of the lever 40 is operably connected to the shaft 9 at 41 so that upon longitudinal adjustment of the shaft 9 by the coupling piston 5 a corresponding movement is imparted to the sleeve valve 25 as will be explained.

An adjustment nut 42 is arranged at the lower end of the regulator 4 for varying the adjustment of the spring 29. A cover cap 43 is removably mounted on the regulator 4.

Operation

It will be seen from the foregoing that when the fluid pressure at the upstream side of the throttle 1 increases above a predetermined differential, the diaphragm 17 moves in a downward direction. Thus valve land 21 permits pressure to be applied to conduit 23 so as to move piston 5 to the left and cause arm 40 to impart a follow-up action to sleeve valve 25, which causes land 21 to close passage 23 to the pressure line 24. Downward movement of the main servo valve 19 also causes valve land 20 to open passage 22 to the exhaust passage 37 until the downward follow-up action of the sleeve valve 25 likewise causes land 20 to close passage 22 to the exhaust passage 37.

Movement of piston 5 to the left will effect a decrease in the driven speed of the supercharger 11 and thereby decrease the pressure at the upstream side of the throttle valve 1 until a predetermined differential pressure is effected.

The conduit 12 leads through the venturi 2 of the carburetor to the intake manifold of an internal combustion engine, not shown.

A decrease in the pressure at the upstream side of the throttle valve 1 below a predetermined differential will cause an opposite effect, movement of main servo valve upward and adjustment of the coupling piston 5 to the right so as to increase the driven speed of the supercharger 11 and the pressure at the upstream side of throttle valve 1.

The latter movement of piston 5 will also cause bell crank lever 40 to move in a clockwise direction permitting spring 31 to move sleeve valve 25 upwardly causing lands 20 and 21 to close the valve openings controlled thereby.

Moreover the bleed passage 36 between chambers 34 and 35 dampens movement of the main servo valve 19 and thereby prevents hunting of the regulator 4.

It will be seen from the foregoing that there has been provided a novel regulator and system for controlling the driven speed of a supercharger so as to maintain a predetermined differential pressure across the throttle valve 1.

Although only one embodiment of the invention has been illustrated and described, various changes in the form and relative arrangements of the parts may be made to suit requirements.

What is claimed is:

1. For use with an internal combustion engine having an induction conduit, a supercharger for said conduit, an adjustably positioned throttle valve in said conduit, a hydraulic coupling for driving said supercharger at a continuously variable speed, and a piston for controlling said coupling and thereby the speed of said supercharger; a regulator comprising a servo valve for controlling the position of said piston, a membrane operably connected to said servo valve, a conduit for connecting one side of said membrane to said induction conduit upstream of said throttle valve, another conduit for connecting the other side of said membrane to said induction conduit downstream of said throttle valve so as to differentially affect said membrane and thereby regulate the speed of said supercharger so as to maintain a predetermined constant differential pressure across said throttle valve at different adjusted positions of said throttle valve, a sleeve valve, said servo valve slidably positioned in said sleeve valve, a spring between an end of the servo valve and an inner end of said sleeve valve, a second spring supporting the other end of said servo valve, a third spring supporting an outer end of said sleeve valve, said springs arranged to resiliently support the sleeve and servo valves, and a movable arm for connecting the sleeve valve to said piston so that upon movement of the piston there is imparted a follow-up movement to the sleeve valve relative to the servo valve.

2. For use with an internal combustion engine having an induction conduit, a supercharger for said conduit, an adjustably positioned throttle valve in said conduit, a hydraulic coupling for driving said supercharger at a continuously variable speed, and a piston for controlling said coupling and thereby the speed of said supercharger; a regulator comprising a servo valve for controlling the position of said piston, a membrane operably connected to said servo valve, a conduit for connecting one side of said membrane to said induction conduit upstream of said throttle valve, another conduit for connecting the other side of said membrane to said induction conduit downstream of said throttle valve so as to differentially affect said membrane and thereby regulate the speed of said supercharger so as to maintain a predetermined constant differential pressure across said throttle valve at different adjusted positions of said throttle valve, a sleeve valve, said servo valve slidably positioned in said sleeve valve, a spring between an end of the servo valve and an inner end of said sleeve valve, a second spring supporting the other end of said servo valve, a third spring supporting an outer end of said sleeve valve, said springs arranged to resiliently support the sleeve and servo valves, and hydraulic damping means connected to said servo valve to retard movement thereof.

3. A supercharger regulator, comprising, in combination, a casing, a sleeve valve slidably mounted in the casing, a main control valve slidably mounted in the sleeve valve, a differential pressure responsive membrane operably connected to said control valve, a pair of liquid filled chambers formed in said casing, a pair of auxiliary membranes, one of said auxiliary membranes forming a wall for one of said chambers and the other auxiliary membrane forming a wall for the other chamber, each of said auxiliary membranes operably connected to said control valve and arranged in spaced relation to said differential pressure responsive membrane, a liquid bleed conduit connecting the one chamber with the other so as to dampen movement of the main control valve.

4. The combination defined by claim 3 including an adjustable end portion of said sleeve valve extending exteriorly of said casing, and a spring to bias said end portion in an outward direction from said casing.

5. The combination defined by claim 3 including an adjustable end portion of said sleeve valve extending exteriorly of said casing, a first spring between said end portion and casing to bias said end portion in an outward direction from said casing, a second spring between said end portion of the sleeve valve and one end of said control valve, and a third spring between the opposite end of said control valve and the interior of said casing and opposing the biasing force of said second spring so as to resiliently support said main valve within said sleeve valve.

6. A supercharger regulator comprising, in combination, a casing, a sleeve valve slidably mounted in the casing, a main control valve slidably mounted in the sleeve valve, a differential pressure responsive membrane operably connected to said control valve, an adjustable end portion of said sleeve valve extending exteriorly of said casing, a first spring between said end portion and casing to bias said end portion in an outward direction from said casing, a second spring between said end portion of the sleeve valve and one end of said control valve, and a third spring between the opposite end of said control valve and the interior of said casing and opposing the biasing force of said second spring so as to resiliently support said main valve within said sleeve valve.

JOSEPH MARINELLI.

REFERENCES CITED

The following references are of record in the file of this patent:

UNITED STATES PATENTS

| Number | Name | Date |
|---|---|---|
| 991,641 | Plantinga | May 9, 1911 |
| 2,393,172 | Larrecq | Jan. 15, 1946 |

FOREIGN PATENTS

| Number | Country | Date |
|---|---|---|
| 8,431 | Great Britain | 1909 |